(12) United States Patent
Bono (10) Patent No.: US 9,649,562 B2
(45) Date of Patent: May 16, 2017

(54) INFORMATION PROCESSING ASSISTANCE DEVICE THAT CACHES IMAGE DATA, INFORMATION PROCESSING DEVICE, AND NON-TRANSITORY COMPUTER-READABLE STORAGE MEDIUM STORING INFORMATION PROCESSING ASSISTANCE PROGRAM

(71) Applicant: DeNA Co., Ltd., Tokyo (JP)

(72) Inventor: Hironori Bono, Tokyo (JP)

(73) Assignee: DENA CO., LTD., Tokyo (JP)

( * ) Notice: Subject to any disclaimer, the term of this patent is extended or adjusted under 35 U.S.C. 154(b) by 0 days.

(21) Appl. No.: 14/711,670

(22) Filed: May 13, 2015

(65) Prior Publication Data
US 2015/0332430 A1 Nov. 19, 2015

(30) Foreign Application Priority Data

May 15, 2014 (JP) ................................ 2014-101227

(51) Int. Cl.
| | | |
|---|---|---|
| G09G 5/36 | (2006.01) |
| A63F 13/355 | (2014.01) |
| G06T 1/60 | (2006.01) |
| G06T 1/20 | (2006.01) |
| G06T 11/20 | (2006.01) |

(52) U.S. Cl.
CPC .............. *A63F 13/355* (2014.09); *G06T 1/20* (2013.01); *G06T 1/60* (2013.01); *G06T 11/203* (2013.01)

(58) Field of Classification Search
CPC ............... G06T 11/20; G06F 17/30902; G06F 17/30899; G09G 2360/121; G09G 5/393
See application file for complete search history.

(56) References Cited

U.S. PATENT DOCUMENTS

| | | | |
|---|---|---|---|
| 9,171,381 B1* | 10/2015 | Cook | G06T 7/2053 |
| 2013/0162664 A1* | 6/2013 | Peacock | G06T 1/60 345/543 |
| 2015/0119139 A1* | 4/2015 | Ladell | G06T 11/40 463/31 |

FOREIGN PATENT DOCUMENTS

JP         08279031 A      10/1996

OTHER PUBLICATIONS

Notification of Reasons for Refusal, received in related Japanese Patent Application No. 2014-101227, on Jun. 17, 2014, 5 pages.
Decision of Refusal, received in related Japanese Patent Application No. 2014-101227, mailed on Oct. 7, 2014, 5 pages.

* cited by examiner

*Primary Examiner* — Hau Nguyen (57) ABSTRACT

An order of calling sub-functions called from a main function for drawing a vector image is obtained, a group of all of sub-functions having a common combination of call sources and being called in succession, is extracted as a group, and a cache function for caching a vector part image drawn with the sub-functions included in the group, as a raster image, is added to the main function to newly generate an improved main function.

13 Claims, 12 Drawing Sheets

```
function DrawGameCharacter_() {
    ClearRect();
    DrawEdge_();
    FillMoon_();
}
function DrawEdge_() {                           ⎫ RASTER IMAGE DRAWING
    if(CacheToBitmap([2],[3],[4],[5]),           ⎬ FUNCTION
        DrawBitmap([2],[3],[4],[5]);,            ⎬ RASTER IMAGE IS READ FROM
        return;)                                 ⎭ CACHE AND DRAWN DrawCurve(); ...; Stroke();
    DrawLine(); ...; Stroke();
                                                   CACHE FUNCTION
    AddCache([2],[3],[4],[5]);                   ⎬ VECTOR PART IMAGE IS
}                                                  CACHED AS RASTER IMAGE
function FillMoon_() {                           ⎫ RASTER IMAGE DRAWING
    if(CacheToBitmap([7],[8]),                   ⎬ FUNCTION
        DrawBitmap([7],[8]);,                    ⎬ RASTER IMAGE IS READ FROM
        return;)                                 ⎭ CACHE AND DRAWN DrawCurve(); ...; Fill();
                                                   CACHE FUNCTION
    AddCache([7],[8]);                           ⎬ VECTOR PART IMAGE IS
}                                                  CACHED AS RASTER IMAGE
function CacheToBitmap(); {
    if(Cache([2],[3],[4],[5]),
        return code;, return null;)              ⎫ RASTER IMAGE IS RETURNED IF
    if(Cache([7],[8]),                           ⎬ THERE IS RASTER IMAGE IN
        return code;, return null;)              ⎭ CACHE
}
```

| IDENTIFIER | CALL FUNCTION | FUNCTION OF CALL SOURCE | GROUP |
|---|---|---|---|
| 0 | ClearRect | DrawGameCharacter | – |
| 1 | DrawEdge | DrawGameCharacter | – |
| 2 | DrawCurve | DrawGameCharacter, DrawEdge | GROUP 1 |
| 3 | Stroke | DrawGameCharacter, DrawEdge | |
| 4 | DrawLine | DrawGameCharacter, DrawEdge | |
| 5 | Stroke | DrawGameCharacter, DrawEdge | |
| 6 | FillMoon | DrawGameCharacter | – |
| 7 | DrawCurve | DrawGameCharacter, FillMoon | GROUP 2 |
| 8 | Fill | DrawGameCharacter, FillMoon | |

FIG. 8

```
function DrawGameCharacter_() {
    ClearRect();
    DrawEdge_();
    FillMoon_();
}
function DrawEdge_() {                          ⎤  RASTER IMAGE DRAWING
   if(CacheToBitmap([2],[3],[4],[5]),           |  FUNCTION
      DrawBitmap([2],[3],[4],[5]);,             ⎬  RASTER IMAGE IS READ FROM
      return;)                                  ⎦  CACHE AND DRAWN DrawCurve(); ...; Stroke();
   DrawLine(); ...; Stroke();
                                                ⎤  CACHE FUNCTION
   AddCache([2],[3],[4],[5]);                   ⎬  VECTOR PART IMAGE IS
}                                               ⎦  CACHED AS RASTER IMAGE
function FillMoon_() {                          ⎤  RASTER IMAGE DRAWING
   if(CacheToBitmap([7],[8]),                   |  FUNCTION
      DrawBitmap([7],[8]);,                     ⎬  RASTER IMAGE IS READ FROM
      return;)                                  ⎦  CACHE AND DRAWN DrawCurve(); ...; Fill();
                                                ⎤  CACHE FUNCTION
   AddCache([7],[8]);                           ⎬  VECTOR PART IMAGE IS
}                                               ⎦  CACHED AS RASTER IMAGE function CacheToBitmap(); {                     ⎤
   if(Cache([2],[3],[4],[5]),                   |
      return code;, return null;)               |  RASTER IMAGE IS RETURNED IF
   if(Cache([7],[8]),                           ⎬  THERE IS RASTER IMAGE IN
      return code;, return null;)               |  CACHE
}                                               ⎦
```

| IDENTIFIER | CALL FUNCTION | FUNCTION OF CALL SOURCE | GROUP |
|---|---|---|---|
| 0 | ClearRect | DrawGameCharacter | – |
| 1 | DrawEdge | DrawGameCharacter | – |
| 2 | DrawCurve | DrawGameCharacter, DrawEdge | GROUP 1 |
| 3 | Stroke | DrawGameCharacter, DrawEdge | |
| 4 | DrawLine | DrawGameCharacter, DrawEdge | |
| 5 | Stroke | DrawGameCharacter, DrawEdge | |
| 9 | DrawCurve | DrawGameCharacter, DrawEdge | |
| 10 | Stroke | DrawGameCharacter, DrawEdge | |
| 6 | FillMoon | DrawGameCharacter | – |
| 7 | DrawCurve | DrawGameCharacter, FillMoon | GROUP 2 |
| 8 | Fill | DrawGameCharacter, FillMoon | |

*FIG. 12*

```
function DrawGameCharacter_() {
    ClearRect();
    DrawEdge_();
    FillMoon_();
}
function DrawEdge_() { if(CacheToBitmap([2],[3],[4],[5],[9
],[10]),DrawBitmap([2],[3],[4],[5],
[9],[10]);,return;)

DrawCurve(); ...; Stroke();
    DrawLine();  ...; Stroke();
    DrawCurve(); ...; Stroke();

AddCache([2],[3],[4],[5],[9],[10]);
}
function FillMoon_() {
  if(CacheToBitmap([7],[8]),
     DrawBitmap([7],[8]);,
     return;)

DrawCurve(); ...; Fill();

AddCache([7],[8]);
}
function CacheToBitmap(); {
  if(Cache([2],[3],[4],[5],[9],[10]),
     return code;, return null;)
  if(Cache([7],[8]),
     return code;, return null;)
```

- RASTER IMAGE DRAWING FUNCTION — RASTER IMAGE IS READ FROM CACHE AND DRAWN
- CACHE FUNCTION — VECTOR PART IMAGE IS CACHED AS RASTER IMAGE
- RASTER IMAGE DRAWING FUNCTION — RASTER IMAGE IS READ FROM CACHE AND DRAWN
- CACHE FUNCTION — VECTOR PART IMAGE IS CACHED AS RASTER IMAGE
- RASTER IMAGE IS RETURNED IF THERE IS RASTER IMAGE IN CACHE

INFORMATION PROCESSING ASSISTANCE DEVICE THAT CACHES IMAGE DATA, INFORMATION PROCESSING DEVICE, AND NON-TRANSITORY COMPUTER-READABLE STORAGE MEDIUM STORING INFORMATION PROCESSING ASSISTANCE PROGRAM

BACKGROUND OF THE INVENTION

Field of the Invention

The present invention relates to an information processing assistance device that caches image data, an information processing device, and an information processing assistance program.

Description of Related Art

Information processing using various images is performed in software of electronic games and the like. Image data is classified into raster image data expressed with a collection of scanning lines like a bitmap format, and vector image data expressed with coordinates (positions) of starting and end points, a direction, and a distance of a line segment, a way of bending, a thickness, and a color of a curved line, a color of a plane surrounded by line segments, and change thereof and the like.

While a vector image has an advantage that the image quality is maintained even if the image is enlarged or reduced, there is a problem that it takes time to draw the vector image. Therefore, when an image is displayed in an information terminal, a drawn vector image is stored in a memory, as a raster image of bitmap or the like, and the raster image is read out from the memory and displayed when the same image is displayed, so that efficiency of the processing is improved.

SUMMARY OF THE INVENTION

In electronic games and the like, only a part of an image is often changed. In a conventional method of storing a raster image, the stored raster image cannot be often used as it is, and an effect of caching the image is small. Further, to store a raster image of an entire image, only a part of which has been changed, a large volume of memory is necessary, which weighs on a memory region of an information processing device.

An objective of the present invention is to provide an information processing assistance device, an information processing device, and an information processing assistance program, which can increase a display speed of an image while suppressing memory consumption.

One aspect of the present invention is an information processing assistance device including: an improved main function generation unit configured to add a cache function for caching a vector part image drawn by sub-functions included in a group, as a raster image, to a main function to newly generate an improved main function, wherein the group is a group of all of the sub-functions having a common combination of call sources and being called in succession, based on an order of calling sub-functions called from the main function for drawing a vector image.

Another aspect of the present invention is an information processing device configured to receive an improved main function from an information processing assistance device including an improved main function generation unit configured to add a cache function for caching a vector part image drawn by sub-functions included in a group, as a raster image, to a main function to newly generate the improved main function, wherein the group is a group of all of the sub-functions having a common combination of call sources and being called in succession, based on an order of calling sub-functions called from the main function for drawing a vector image, and to cache the vector part image in a memory using the cache function when drawing the vector image with the improved main function.

Another aspect of the present invention is a non-transitory computer-readable storage medium storing an information processing assistance program for causing a computer to function as: an improved main function generation unit configured to add a cache function for caching a vector part image drawn by sub-functions included in a group, as a raster image, to a main function to newly generate the improved main function, wherein the group is a group of all of the sub-functions having a common combination of call sources and being called in succession, based on an order of calling sub-functions called from the main function for drawing a vector image.

Here, it is favorable to include a call order extraction unit that obtains an order of calling sub-functions called from the main function for drawing a vector image, and a group extraction unit that extracts a group of all of the sub-functions having a common combination of call sources and being called in succession, as a group.

Further, it is favorable that the improved main function generation unit further adds a raster image drawing function that reads and uses the raster image if there is the raster image already cached by the cache function, to the improved main function.

Further, it is favorable to generate the improved main function and transmit the improved main function to an external information processing device when there is an access from the external information processing device to the main function.

According to the present invention, a method of caching image data, which can increase a display speed of an image while suppressing memory consumption, can be provided.

DETAILED DESCRIPTION OF THE INVENTION

<Basic Configuration>

Figure 1:
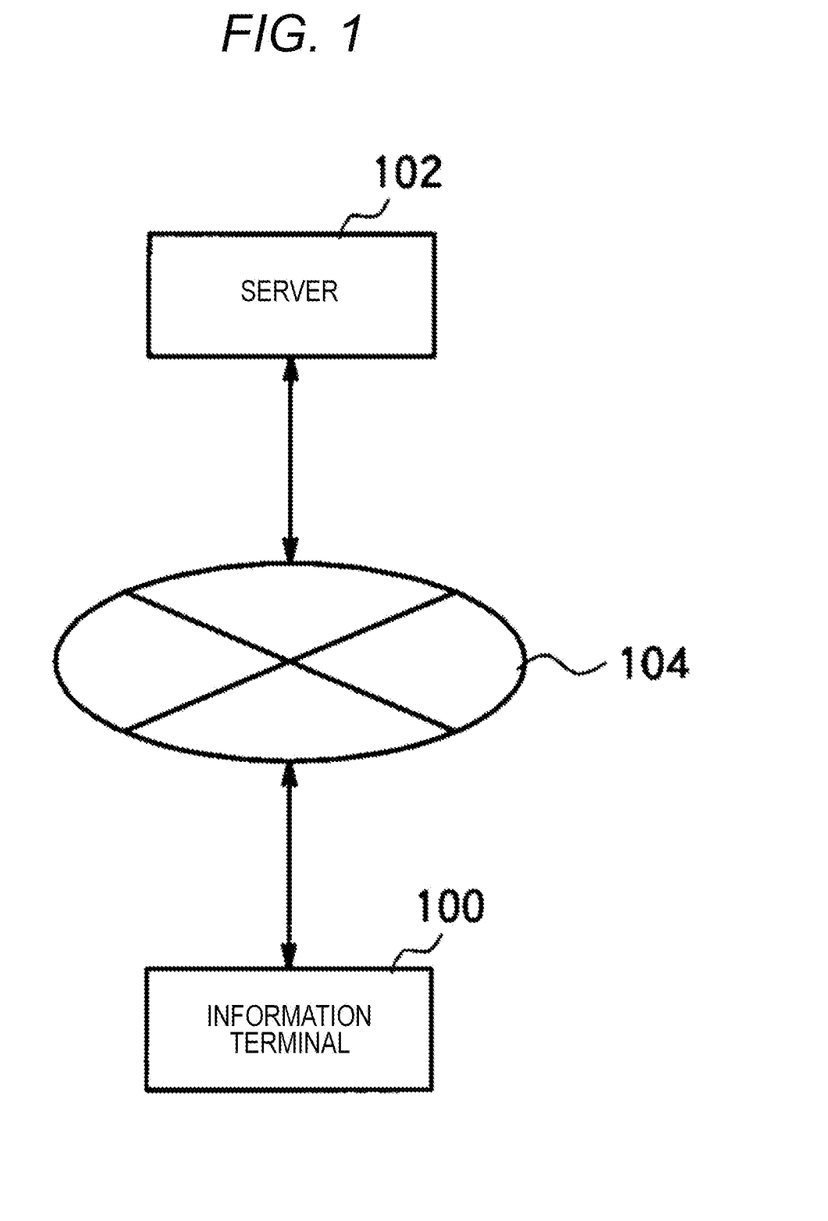
FIG. 1 is a diagram illustrating a configuration of an information processing system in an embodiment of the present invention.

An information processing system in an embodiment of the present invention include, as illustrated in FIG. 1, an information terminal 100 and a server 102. The server 102 is connected with the information terminal 100 through an information communication network 104 in a mutually communicable manner.

Figure 2:
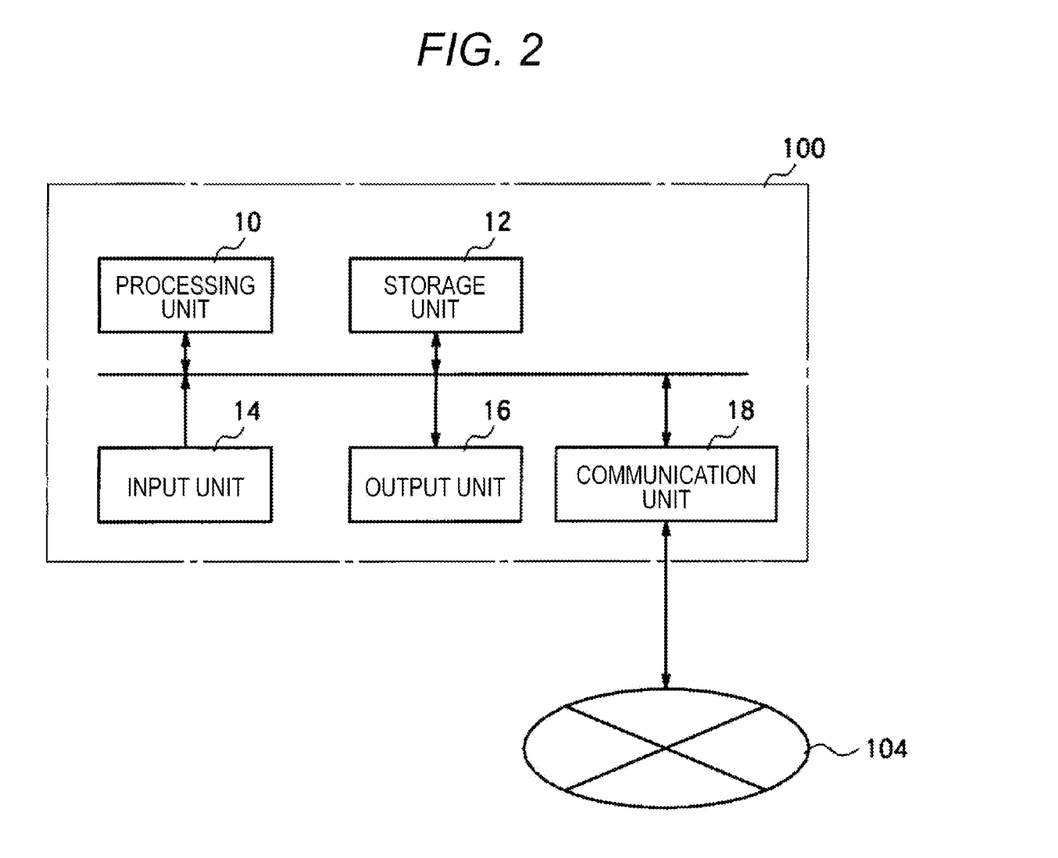
FIG. 2 is a diagram illustrating a configuration of an information terminal in an embodiment of the present invention.

The information terminal 100 includes, as illustrated in FIG. 2, a processing unit 10, a storage unit 12, an input unit 14, an output unit 16, and a communication unit 18. The information terminal 100 has a basic configuration of a mobile terminal that can perform communication, such as a mobile phone, a smart phone, or a tablet terminal.

The processing unit 10 includes a means to perform calculation processing, such a CPU. The processing unit 10 functions as an information processing device that realizes processing of an electronic game and the like in the information terminal 100 by executing an electronic game program stored in the storage unit 12. Especially, the processing unit 10 performs processing of drawing an image to be used in the electronic game by executing a function (main function) for image processing included in the electronic game program. Note that the program executed in the information terminal 100 is not limited to the electronic game program, and any program may be used as long as the program is accompanied by image processing. The storage unit 12 includes a storage means such as a semiconductor memory or a memory card. The storage unit 12 is connected with the processing unit 10 in an accessible manner, and stores information such as the electronic game program and data necessary in the processing. The input unit 14 includes a means to input information to the information terminal 100. The input unit 14 includes, for example, a touch panel, a button, and the like that receive an input from a user. The output unit 16 includes a means to output processing results in a user interface (UI) screen for receiving input information from the user and in the information terminal 100. The output unit 16 includes, for example, a display that presents an image to the user. The communication unit 18 includes an interface for exchanging information with another information communication device through the information communication network 104. The communication unit 18 supports both of wired and wireless communication.

Figure 3:
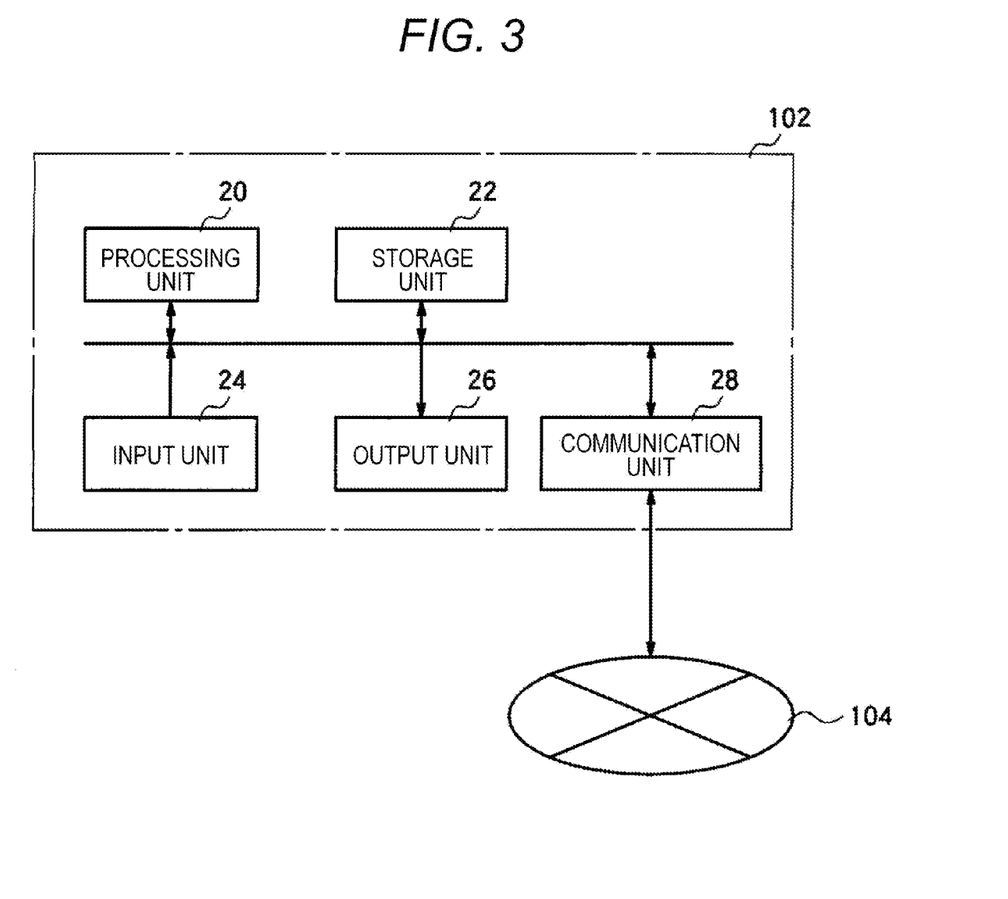
FIG. 3 is a diagram illustrating a configuration of a server in an embodiment of the present invention.

The server 102 includes, as illustrated in FIG. 3, a processing unit 20, a storage unit 22, an input unit 24, an output unit 26, and a communication unit 28. The server 102 includes a basic configuration of a computer that has a communication function.

The processing unit 20 includes a means to perform calculation processing, such a CPU. The processing unit 20 performs information processing in cooperation with the information terminal 100 by executing a program stored in the storage unit 22. Especially, the processing unit 20 functions as an information processing assistance device that generates a function for image processing to be used in the electronic game program and the like, and transmits the function to the information terminal 100 by executing an information processing assistance program. The storage unit 22 includes a storage means such as a semiconductor memory or a hard disk. The storage unit 22 is connected with the processing unit 20 in an accessible manner, and stores information such as the information processing assistance program, the electronic game program (including the function for image processing), and data used in the information processing. The input unit 24 includes a means to input information to the server 102. The input unit 24 includes, for example, a keyboard and the like that receive an input from the user. The output unit 26 includes a means to output processing results in a user interface (UI) screen for receiving input information from the user and in the server 102. The output unit 26 includes a display that presents an image to the user. The communication unit 28 includes an interface for exchanging information with the information terminal 100 or another information communication device through the information communication network 104. The communication unit 28 supports both of wired and wireless communication.

Note that, in the present embodiment, an example in which the information terminal 100 and the server 102 perform image drawing processing in cooperation with each other will be described. The image drawing processing is used when a game screen is displayed in an electronic game, for example.

<Basic Processing>

In the present embodiment, the server 102 executes the information processing assistance program that improves the main function for displaying a vector image. The information terminal 100 accesses the server 102 when executing an application of an electronic game, and acquires and executes an electronic game program (an application program). Displaying of an image in the electronic game is performed by execution of an image drawing program included in or attached to the electronic game program. Hereinafter, description will be given on the assumption that the image drawing program is expressed with a function (called main function). However, an application range of the present invention is not limited to the embodiment.

The server 102 executes an information processing assistance method of executing the information processing assistance program, improving the main function for drawing an image, and generating an improved main function. Hereinafter, the information processing assistance method in the present embodiment will be described with reference to the flowchart of FIG. 4. With the method, the server 102 functions as an information processing assistance device.

Figure 4:
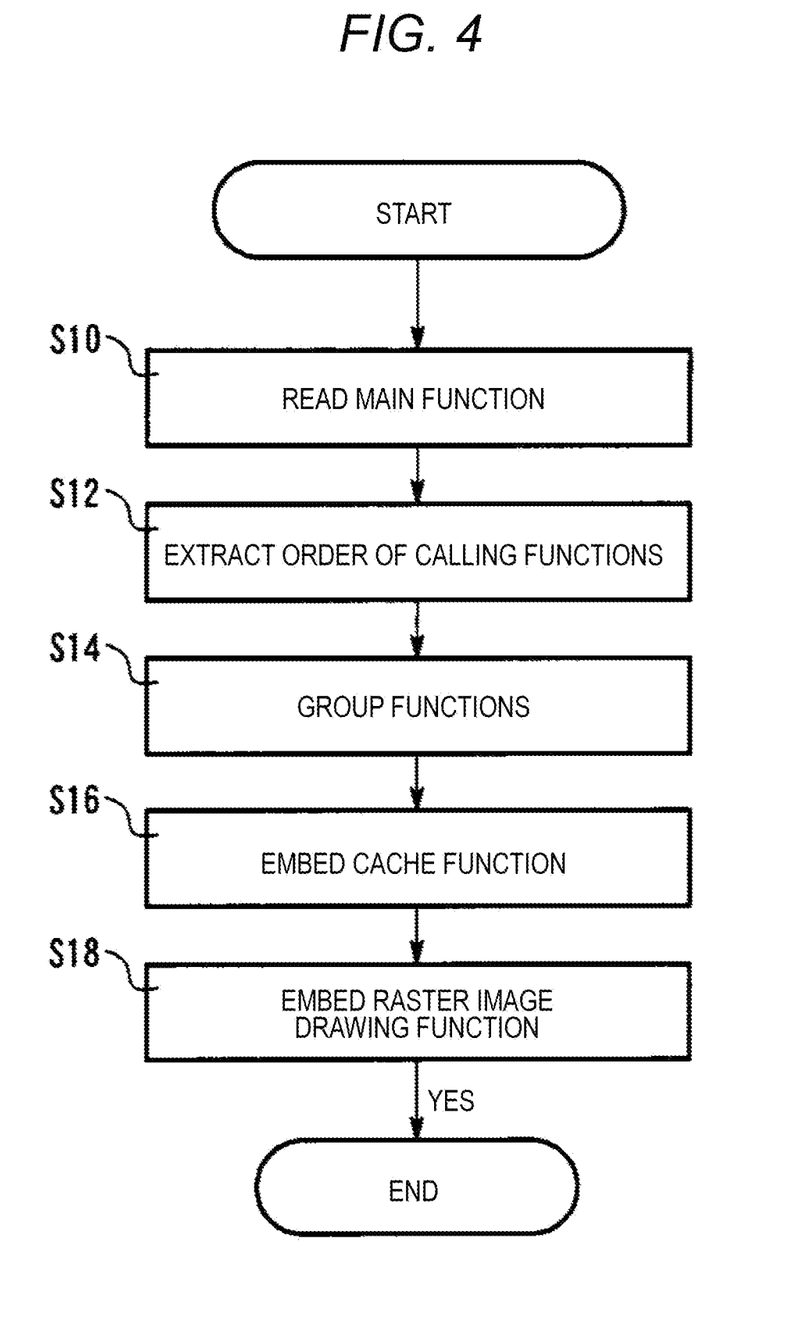
FIG. 4 is a flowchart illustrating an information processing assistance method in an embodiment of the present invention.

At step S10, the main function is read out. The processing unit 20 of the server 102 reads out the main function stored in the storage unit 22. The main function is a program written for displaying a vector image. The main function is written in JavaScript (registered trademark) or the like.

Figure 5A:
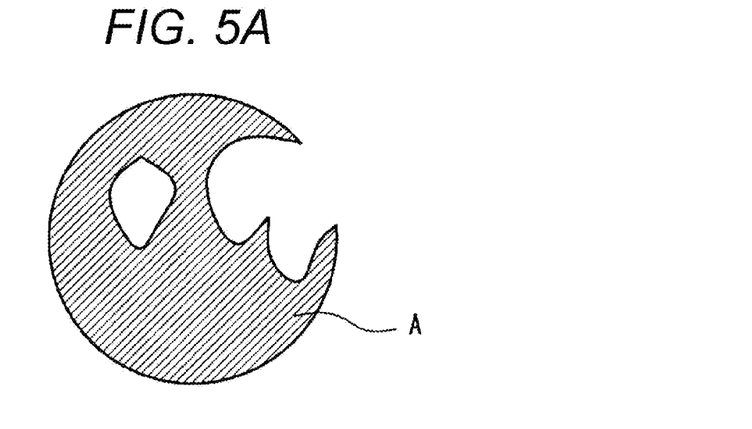
FIGS. 5A to 5C are diagrams illustrating a configuration example of a vector images in an embodiment of the present invention.
Figure 5B:
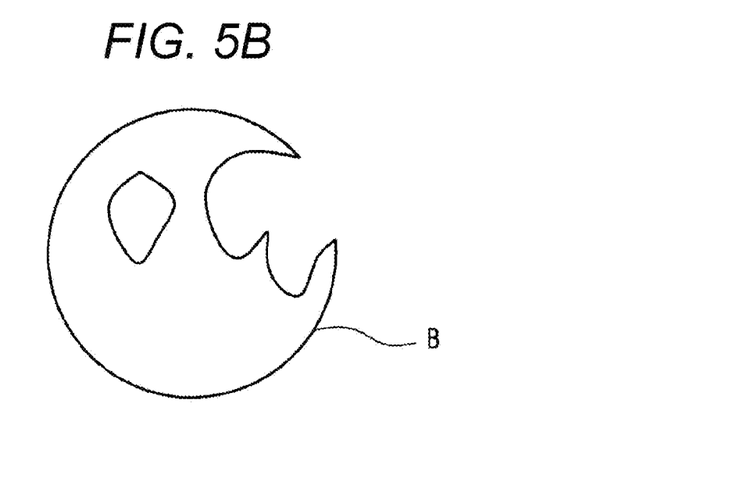
Figure 5C:
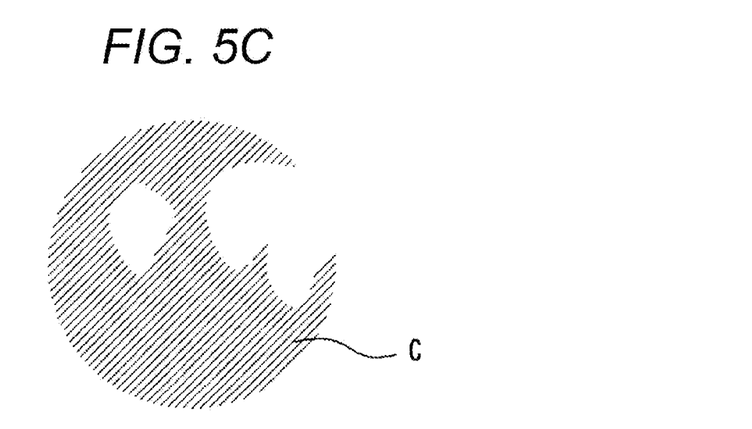

The vector image is expressed with coordinates (positions) of starting and end points, a direction, and a distance of a line segment, a way of bending, a thickness, and a color of a curved line, a color of a plane surrounded by line segments, and change thereof and the like. For example, as illustrated in FIGS. 5A to 5C, a vector image A is expressed by a combination of a vector part image B that expresses a contour of the vector image A by a combination of line segments, and a vector part image C that fills a region surrounded by the line segments of the vector part image B with a color.

The main function (figure drawing program) is written as a combination of sub-functions for drawing coordinates (positions) of starting and end points, a direction, and a distance of a line segment, a way of bending, a thickness, and a color of a curved line, a color of a plane surrounded by line segments, and change thereof and the like.

Figure 6:
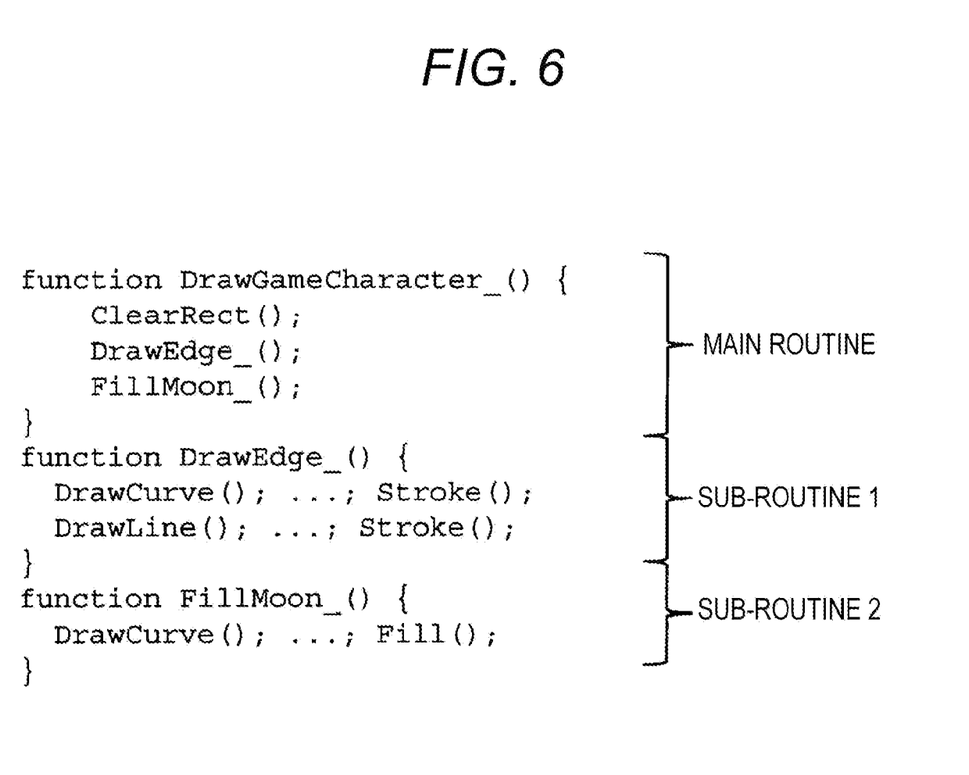
FIG. 6 is a diagram illustrating an example of a main function in an embodiment of the present invention.

For example, as illustrated in FIG. 6, the vector image is drawn with the main function configured from a main routine, a sub-routine 1, and a sub-routine 2. In the example of FIG. 6, a drawing region is cleared by ClearRect function of the main routine, and the vector part images are drawn by calling of DrawEdge function and FillMoon function. Then, the vector part images are combined, so that the entire vector image is drawn.

The DrawEdge function is a sub-function defined in the sub-routine 1, and is a function for drawing the vector part image included in the vector image. Here, the DrawEdge function is defined as a function to draw a contour expressed by the line segments included in the vector image A, as illustrated by the vector part image B in FIG. 5B. The DrawEdge function includes general defining functions such as DrawCurve function+Stroke function for drawing curved lines and DrawLine function+Stroke function for drawing straight lines. The FillMoon function is a sub-function defined in the sub-routine 2, and is a function for drawing the vector part image included in the vector image. Here, the FillMoon function is defined as a function to draw a filled region included in the vector image A, as illustrated by the vector part image C in FIG. 5C. The FillMoon function includes general defining functions such as DrawCurve function+Fill function for filling a region, and the like.

At step S12, an order of calling the sub-functions in the main function is obtained. The processing in this step corresponds to a call order extraction unit. The processing unit 20 of the server 102 checks the order of calling the sub-functions that are to be called from the main function read at step S10. The call order is stored in the storage unit 22, as a sub-function call list. The processing unit 20 registers the sub-functions called when the main function is processed from the beginning, to the sub-function call list in order together with a function name serving as a call source.

Figure 7:
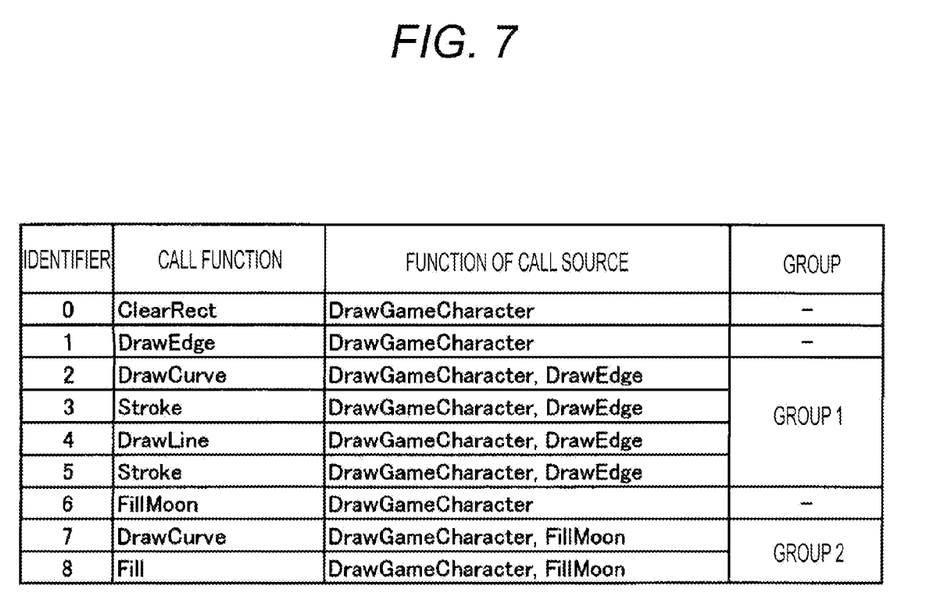
FIG. 7 is a diagram illustrating an example of a sub-function call list in an embodiment of the present invention.

For example, in the example of the main function (DrawGameCharacter) of FIG. 6, first, the ClearRect function is called. At this time, as illustrated in FIG. 7, the ClearRect function is registered to the sub-function call list in association with the name of the function serving as the call source, that is, the name of the main function (DrawGameCharacter).

Next, the DrawEdge function is called. Here, as illustrated in FIG. 7, the DrawEdge function is registered to the sub-function call list in association with the name of the function serving as the call source, that is, the name of the main function (DrawGameCharacter).

At this time, in the DrawEdge function, functions are further called in its internal processing, and thus those functions are also registered to the sub-function call list. That is, in the DrawEdge function, the DrawCurve function, the Stroke function, the DrawLine function, and the Stroke function are called in order. Therefore, as illustrated in FIG. 7, these functions are registered to the sub-function call list in the call order in association with the sub-function (DrawEdge) that is the function serving as the call source, and the main function (DrawGameCharacter) that is the function serving as the original call source.

Next, the FillMoon function is called. Here, as illustrated in FIG. 7, the FillMoon function is registered to the sub-function list in association with the name of the function serving as the call source, that is, the name of the main function (DrawGameCharacter).

At this time, in the FillMoon function, functions are further called in its internal processing, and thus those functions are also registered to the sub-function call list. That is, in the FillMoon function, the DrawCurve function and the Fill function are called in order. Therefore, as illustrated in FIG. 7, these functions are registered to the sub-function call list in the call order in association with the sub-function (FillMoon) that is the function serving as the call source, and the main function (DrawGameCharacter) that is the function serving as the original call source.

Which sub-function up to which layer being considered to extract the order may just be determined in advance. Further, functions may be considered until when a general defining function prepared in the system in advance is called, instead of a user defining function defined in the electronic game program.

At step S14, the functions called based on the function serving as the call source are divided into groups. The processing in this step corresponds to a group extraction unit. The processing unit 20 of the server 102 extracts a group of the sub-functions, all of which are called in succession, of the sub-functions having a common combination of the call sources, as one group, based on the call order of the sub-functions obtained at step S12.

For example, when the sub-function call list of FIG. 7 is generated, as a group of functions called only from the main function (DrawGameCharacter), there are the ClearRect function, the DrawEdge function, and the FillMoon function. Here, not all of the ClearRect function, the DrawEdge function, and the FillMoon function included in the group of functions called only from the main function (DrawGameCharacter) are called in succession. That is, the FillMoon function is not sequentially called with respect to the DrawEdge function. Therefore, these functions are not grouped.

Next, as a group of functions called from the main function (DrawGameCharacter) and the sub-function (DrawEdge), there are the DrawCurve function, the Stroke function, the DrawLine function, and the Stroke function. Here, all of the DrawCurve function, the Stroke function, the DrawLine function, and the Stroke function included in the group of functions called from the main function (DrawGameCharacter) and the sub-function (DrawEdge) are called in succession. Therefore, these DrawCurve function, Stroke function, DrawLine function, and Stroke function are extracted as one group.

Further, as a group of functions called from the main function (DrawGameCharacter) and the sub-function (FillMoon), there are the DrawCurve function and the Fill function. Here, all of the DrawCurve function and the Fill function included in the group of functions called from the main function (DrawGameCharacter) and the sub-function (FillMoon) are called in succession. Therefore, these DrawCurve function and Fill function are extracted as one group.

In the present embodiment, processing of re-writing the main function is performed to group the sub-functions, draw the vector part images expressed with the respective groups of the sub-functions and then cache the vector part images, as data of raster images, and read and use the cached raster images when next the function of the processing of drawing the vector part images is called.

At step S16, processing of embedding a cache function to the main function is performed. The processing of this step and processing of step S18 described below correspond to an improved main function generation unit. The processing unit 20 of the server 102 performs the processing of embedding a cache function for caching the vector part images, as the raster images, when the vector part images are drawn with the respective groups of the sub-functions grouped at step S14.

For example, in the example of the main function of FIG. 6, the DrawCurve function, the Stroke function, the DrawLine function, and the Stroke function included in the DrawEdge function are grouped, and thus AddCache function for caching the vector part image drawn with these functions, as the raster image, is embedded after the DrawCurve function, the Stroke function, the DrawLine function, and the Stroke function in the DrawEdge function. Further, the DrawCurve function and the Fill function included in the FillMoon function are grouped, and thus the AddCache function for caching the vector part image drawn with these functions, as the raster image, is embedded after the DrawCurve function and the Fill function in the FillMoon function.

Figure 8:
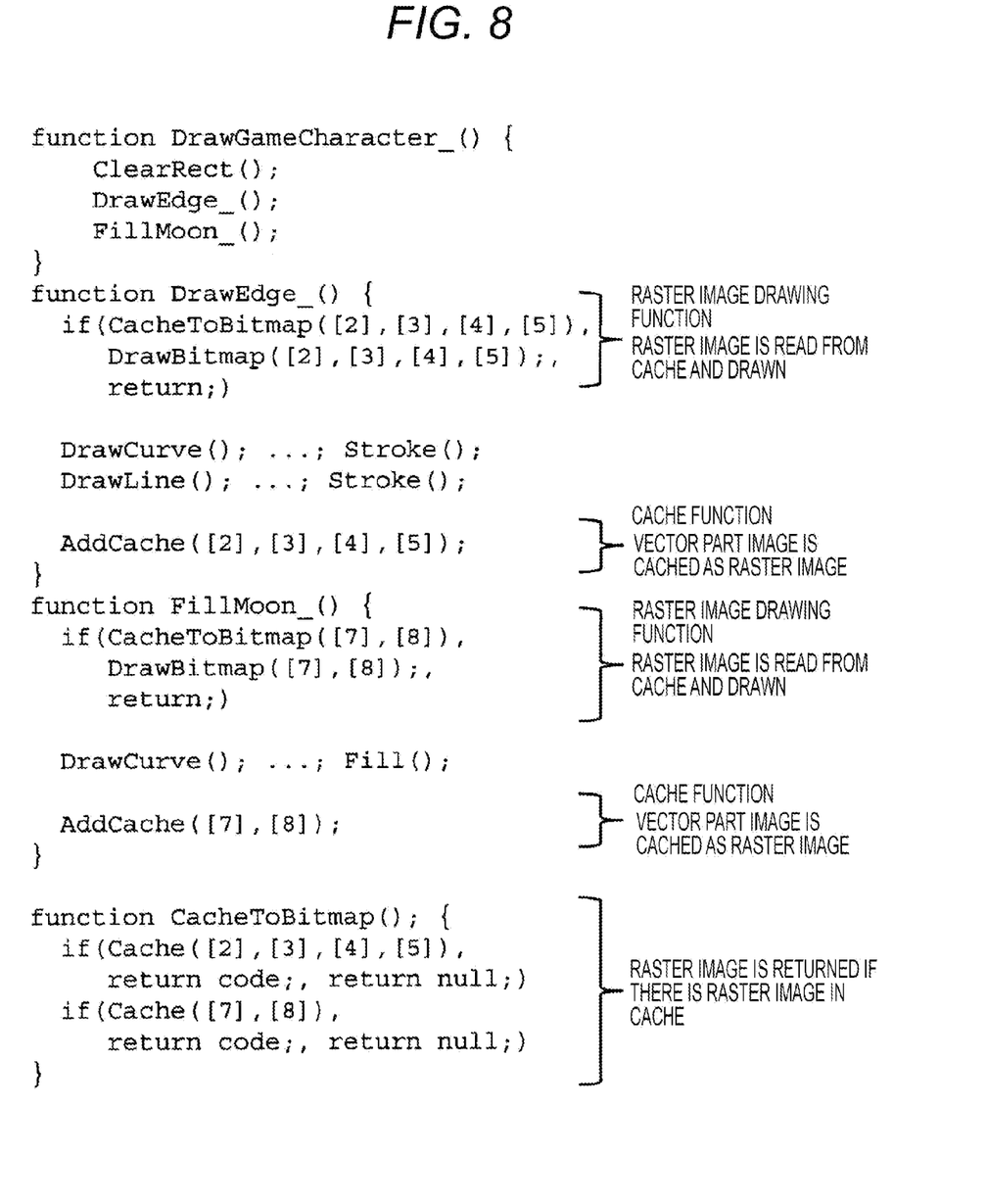
FIG. 8 is a diagram illustrating an example of an improved main function in an embodiment of the present invention.

Here, the AddCache function is a cache function for caching an image specified as a factor, in the storage unit, as the raster image. In the example of FIG. 8, AddCache([2],[3],[4],[5]); expresses that the vector part image drawn with the DrawCurve function, the Stroke function, the DrawLine function, and the Stroke function in the DrawEdge function is cached as the raster image. Here, [2], [3], [4] and [5] respectively mean the image data drawn with the DrawCurve function, the Stroke function, the DrawLine function, and the Stroke function in the DrawEdge function. Further, AddCache([7],[8]); expresses that the vector part image drawn with the DrawCurve function and the Fill function in the FillMoon function is cached as the raster image. Here, [7] and [8] respectively mean the image data drawn with the DrawCurve function and the Fill function in the FillMoon function.

When once the main function is executed by such embedding of the cache function, the raster image is cached for each vector part image drawn with each group of the sub-functions.

At step S18, processing of embedding a raster image drawing function to the main function is performed. When the raster image has already been cached about the group of the sub-functions grouped at step S14, the processing unit 20 of the server 102 performs the processing of embedding a raster image drawing function for reading and using the cached raster image, to the main function, instead of drawing the vector image again.

In the example of the main function of FIG. 6, the DrawCurve function, the Stroke function, the DrawLine function, and the Stroke function included in the DrawEdge function are grouped, and when the vector part image is drawn with the group of these functions at step S16, the cache function to perform the processing of caching the vector part image, as the raster image, is embedded. Further, when the vector part image has been cached as the raster image, the raster image drawing function for reading and using the cached raster image, instead of drawing the vector image, when next the processing of drawing the vector image with these functions is called, is embedded.

In the present embodiment, a function to read and draw the data of the raster image if there is the cached raster image, and to draw the vector image with the DrawCurve function, the Stroke function, the DrawLine function, and the Stroke function if there is no cached raster image is embedded before the DrawCurve function, the Stroke function, the DrawLine function, and the Stroke function in the DrawEdge function, as the raster image drawing function.

To be specific, if the raster image is cached, the raster image is read and drawn, and the processing is put back to the function of the call source. Further, if the raster image is not cached, the vector part image is drawn with the DrawCurve function, the Stroke function, the DrawLine function, and the Stroke function, and the image is cached as the raster image, and then the processing is put back to the function of the call source.

In the example of FIG. 8, a code of if(CacheToBitmap([2],[3], [4], [5]),DrawBitmap([2], [3],[4],[5]);,return;) is embedded before the DrawCurve function, the Stroke function, the DrawLine function, and the Stroke function. Further, CacheToBitmap function is defined as an external function.

When the code and the function are executed, the following processing is performed. The CacheToBitmap function applies the Cache function as a conditional expression of the if function, and returns the data of the raster image if the cache data of the raster image as the factor of the CacheToBitmap function is stored, and returns null if the cache data of the raster image is not stored. Here, the CacheToBitmap function is called using identifiers of [2], [3], [4], and [5] that identify the image data, as the factors. In the CacheToBitmap function, a code of if(Cache([2],[3],[4],[5]),return code;, return null;) is embedded. The Cache([2],[3],[4],[5]) is a function to check whether the image data identified with [2], [3], [4], and [5] is cached. The CacheToBitmap function returns the image data as a return value, with a return code, if the image data identified with [2], [3], [4], and [5] is cached, and returns null as the return value, with return null, if the image data is not cached. In the call source of the CacheToBitmap function, the raster image is drawn with the DrawBitmap([2],[3],[4],[5]) if the return value is not null, and the processing is put back to the function of the call source of the DrawEdge function. If the return value is null, the if function is skipped, the vector part image is drawn with the DrawCurve function, the Stroke function, the DrawLine function, and the Stroke function, and the image is cached as the raster image with the AddCache function, and then the processing is put back to the function of the call source.

Further, in the example of the main function of FIG. 6, the DrawCurve function and the Fill function included in the FillMoon function are grouped. At step S16, the cache function to perform processing of caching the vector part image, as the raster image, when the vector part image is drawn with the group of these functions, is embedded. Therefore, when the vector part image has been cached as the raster image, the raster image drawing function for reading and using the cached raster image, instead of drawing the vector image, when next the processing of drawing the vector image with these functions is called, is embedded.

In the present embodiment, a function to read and draw the raster image if there is the cached raster image, and to draw the vector image with the DrawCurve function and the Fill function if there is no cached raster image is embedded before the DrawCurve function and the Fill function in the FillMoon function, as the raster image drawing function. To be specific, the raster image is read and drawn if the raster image is cached, and the processing is put back to the function of the call source. Further, the vector part image is drawn with the DrawCurve function and the Fill function if no raster image is cached, and the processing is put back to the function of the call source after the image is cached as the raster image.

In the example of FIG. 8, a code of if(CacheToBitmap([7],[8]),DrawBitmap([7],[8]);,return;) is embedded before the DrawCurve function and the Fill function. In the CacheToBitmap function, the Cache function is applied as a conditional expression of the if function. The CacheToBitmap function returns the data of the raster image if the cache data of the raster image as the factor of the CacheToBitmap function is stored, and returns null if no cache data of the raster image is stored. Here, the CacheToBitmap function is called using identifiers of [7] and [8] that identify the image data as the factors. Then, in the CacheToBitmap function, a code of if(Cache([7],[8]),return code;, return null;) is embedded, and Cache([7],[8]) is a function to check whether the image data identified with [7] and [8] is cached. The CacheToBitmap function returns the image data as a return value, with a return code, if the image data identified with [7] and [8] is cached, and returns null as a return value, with return null, if no image data is cached. In the call source of the CacheToBitmap function, the raster image is drawn with the DrawBitmap([7],[8]) if the return value is not null, and the processing is put back to the function of the call source of the DrawEdge function. If the return value is null, the if function is skipped, the vector part image is drawn with the DrawCurve function and the Fill function, and the processing is put back to the function of the call source after the image is cached as the raster image with the AddCache function.

As described above, the processing of embedding the cache function for caching and storing the raster image in the main function, and the raster image drawing function for reading and using the cached raster image is performed.

Such a main function is transmitted from the server 102 to the information terminal 100 in response to a request from the information terminal 100, and can be executed in the information terminal 100. For example, if the main function is embedded in a part of the electronic game program processed in the information terminal 100, the cached raster image can be read and used without performing the processing of drawing the vector images again, when next the same main function is called after the main function is called and the vector images are drawn once. Accordingly, it is not necessary to repeat the processing of drawing the same vector image, and a load of the processing in the information terminal 100 can be reduced. Further, the image drawing processing can be accelerated.

<Update Processing>

In the present embodiment, the group is made for each vector part image that configures the entire vector image, instead of for the entire vector image, and is cached as the raster image. Therefore, if change is caused in a part of the vector part images, the main function in which only the part is changed is prepared, so that the cached raster image can be used without drawing the vector part image that has no change again.

Figure 9:
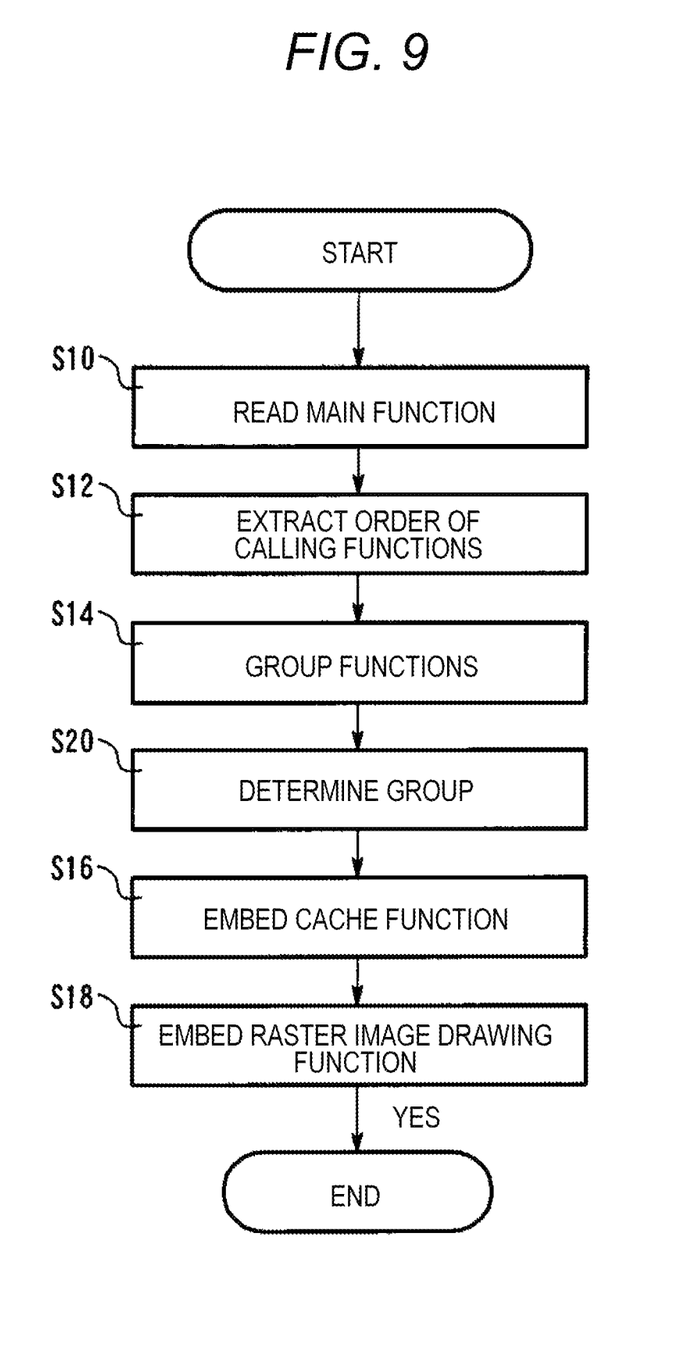
FIG. 9 is a flowchart illustrating an information processing assistance method at the time of updating in an embodiment of the present invention.

For example, a case in which the electronic game program is improved and the main function is updated will be described with reference to the flowchart of FIG. 9. The flowchart of FIG. 9 is the same as the flowchart of FIG. 4 except for step S20.

Figure 10:
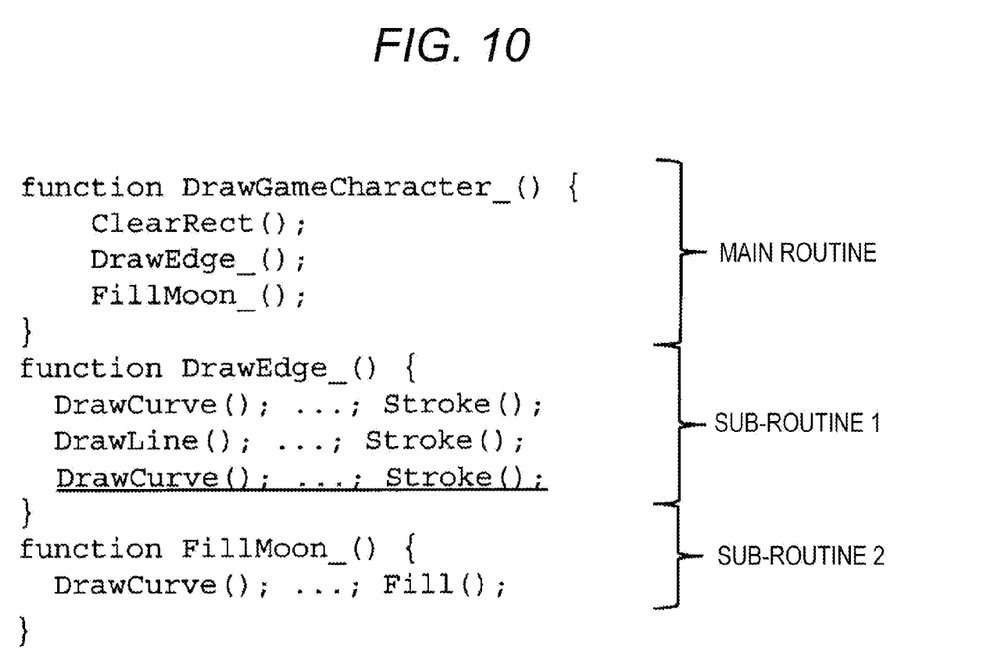
FIG. 10 is a diagram illustrating an example of an example of an updated main function in an embodiment of the present invention.

Here, as illustrated in FIG. 10, a case in which the DrawCurve function and the Stroke function are newly added to the DrawCurve function, the Stroke function, the DrawLine function, and the Stroke function of the DrawEdge function will be exemplarily described.

Figure 11:
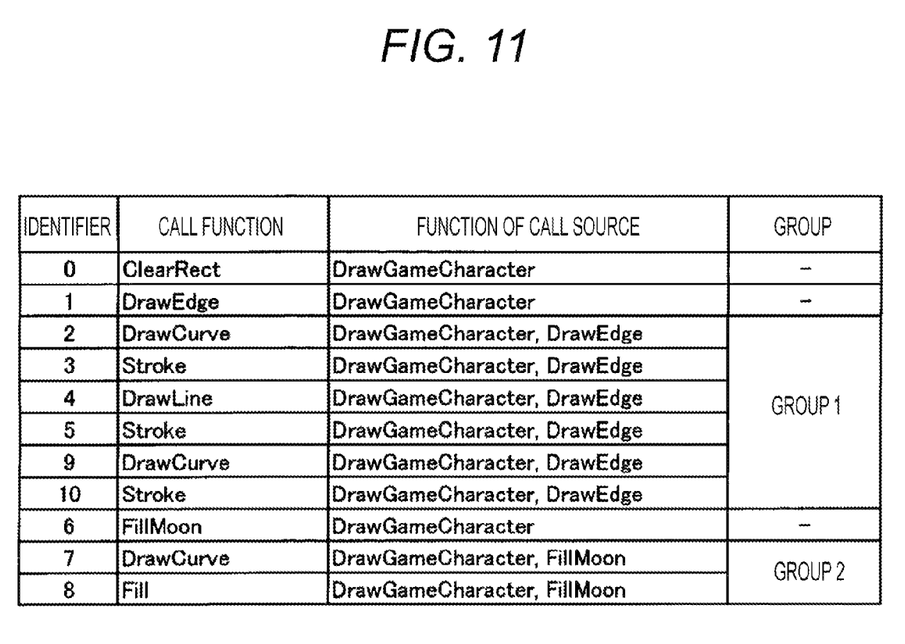
FIG. 11 is a diagram illustrating an example of an updated sub-function call list in an embodiment of the present invention.

At step S12, the sub-function call list as illustrated in FIG. 11 is generated. At step S14, the DrawCurve function, the Stroke function, the DrawLine function, the Stroke function, the DrawCurve function, and the Stroke function in the DrawEdge function are grouped, and the DrawCurve function and the Fill function in the FillMoon function are grouped.

At step S20, a group that requires processing of embedding new cache function and raster image drawing function is determined. The processing unit 20 of the server 102 does not need to perform the new cache function and raster image drawing function by the processing of and after step S16, and may just embed the existing cache function and raster image drawing function, for a group having the same content as that of the main function before update. The processing unit 20 of the server 102 recognizes a group that has been updated, as an object to which the new cache function and raster image drawing function are embedded.

Figure 12:
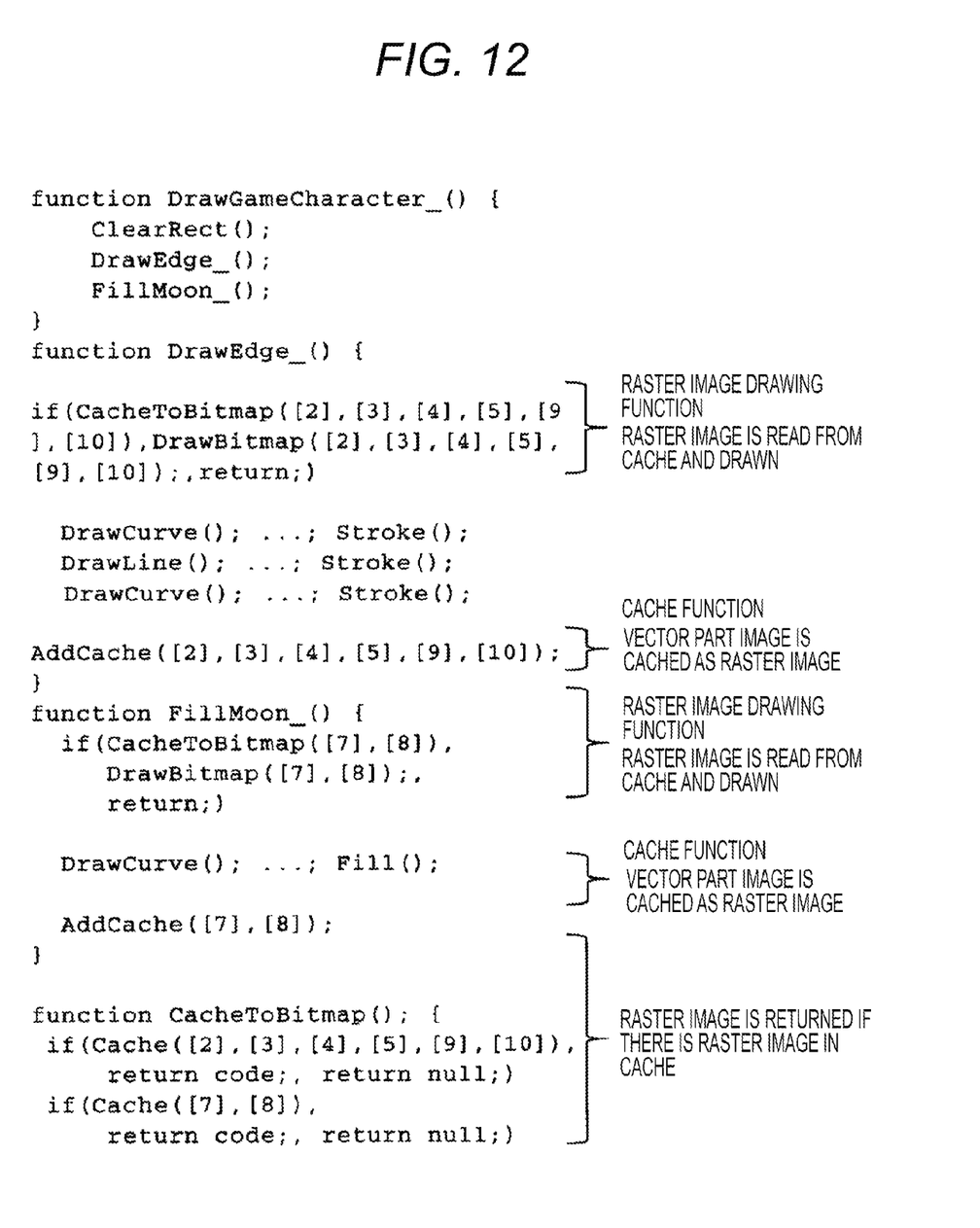
FIG. 12 is a diagram illustrating an example of an updated improved main function in an embodiment of the present invention.

At step S16, the processing of embedding a cache function to the main function is performed. At this time, a cache function similar to the existing one is embedded to the group determined that the existing cache function and raster image drawing function may just be embedded, at step S20. In the example of FIG. 10, the DrawCurve function and the Fill function of the FillMoon function have not been updated, and thus the same cache function as that of the main function before update is embedded, as illustrated in FIG. 12.

Meanwhile, a new cache function is embedded to the group determined that the new cache function and raster image drawing function should be embedded, at step S20. In the example of FIG. 10, the DrawCurve function, the Stroke function, the DrawLine function, the Stroke function, the DrawCurve function, and the Stroke function in the DrawEdge function have been updated, and thus the new cache function is embedded, as illustrated in FIG. 12.

At step S18, the processing of embedding a raster image drawing function to the main function is performed. At this time, a raster image drawing function similar to the existing one is embedded to the group determined that the existing cache function and raster image drawing function may just be embedded, at step S20. In the example of FIG. 10, the DrawCurve function and the Fill function of the FillMoon function have not been updated, and thus the same raster image drawing function as that of the main function before update is embedded, as illustrated in FIG. 12.

Meanwhile, a new raster image drawing function is embedded to the group determined that the new cache function and raster image drawing function should be embedded, at step S20. In the example of FIG. 10, the DrawCurve function, the Stroke function, the DrawLine function, the Stroke function, the DrawCurve function, and the Stroke function in the DrawEdge function have been updated, and thus the new raster image drawing function is embedded, as illustrated in FIG. 12.

As described above, even when the main function is updated, the same cache function and raster image drawing function as those before update are embedded to the group that has not been changed from before. Therefore, the updated main function is sent to the information terminal 100, and the processing of drawing an image can be performed using the already cached raster image as it is, for the group that is not changed when the main function is executed in the information terminal 100.

Meanwhile, the new cache function and raster image drawing function according to updated content are embedded to the group that has been changed from before. Therefore, the updated main function is sent to the information terminal 100, and the processing of drawing the vector part images is newly performed without using the cached raster image, for the group that is changed when the main function is executed in the information terminal 100. Then, after the processing of drawing the vector part images is performed once, the new vector part images are cached as the raster images, and the cached raster images can be used in the next time.

As described above, according to the present embodiment, the method of caching image data, which can increase the display speed of an image while suppressing the memory consumption, can be provided.

<Modification>

In the above-described embodiment, an embodiment in which all of the call order extraction processing, the group extraction processing, and the improved main function generation processing are performed has been described, the call order extraction processing obtaining the order of calling the sub-functions in the server 102, the group extraction processing extracting a group of sub-functions that are to be called in succession, as a group, and the improved main function generation processing adding the cache function for caching the vector part images drawn with the sub-functions included in the group, as the raster images, to the main function.

However, it is not necessary to perform all of the processing in the server 102, and a part of the processing may be performed in the information terminal 100. To be specific, in the server 102, a program for performing any of the call order extraction processing, the group extraction processing, and the improved main function generation processing is embedded in the game program, and the game program is transmitted to the information terminal 100. Then, the embedded program may just be executed in the information terminal 100.

For example, the processing may just be performed in the following process, assuming that the game program is configured from an HTML file "game.html" and a JavaScript file "game.js". In this example, similar to the above-described embodiment, a JavaScript file "loader.js" for analyzing functions included in the "game.js", and generating the call order extraction processing, the group extraction processing, and the improved main function is used.

(1) The loader "loader.js" is loaded from the "game.html", instead of the "game.js".
(2) The "loader.js" loads the "game.js".
(3) The "loader.js" analyzes functions that draw vector images in the "game.js", similarly to the above-described embodiment, and executes the call order extraction processing, the group extraction processing, and the improved main function generation processing to add the cache function to the "game.js".
(4) The "loader.js" executes the improved "game.js".

As described above, the call order extraction processing, the group extraction processing, and the improved main function generation processing can be performed in the information terminal 100.

What is claimed is:

1. An information processing assistance device, comprising:
   an improved main function generation unit generating an improved main function by:
   determining whether a vector part image of a vector image is changed by determining whether a group of sub-functions is updated without drawing a raster image from the part of the vector image, the raster image being drawn from the vector part image when the group of sub-functions is executed; and
   adding, when the vector part image of the vector image is determined to be changed, the group of sub-functions and a cache function to a main function, the raster image drawn from the changed vector part image being cached when the cache function is executed,
   wherein the raster image is displayed on a user device when the main function is executed, and
   wherein the group of sub-functions are called in succession and in a predetermined order from a common call source when the main function includes the group of sub-functions and the main function is executed.

2. The information processing assistance device according to claim 1, further comprising:
   a call order extraction unit configured to obtain the predetermined order; and
   a group extraction unit configured to extract the group of sub-functions having the common call source.

3. The information processing assistance device according to claim 1, wherein the improved main function generation unit further adds, when the raster image is cached, a raster image drawing function to the improved main function, the raster image being read and used when the raster image drawing function is executed.

4. The information processing assistance device according to claim 1, wherein the improved main function generation unit is configured to transmit the improved main function to an external information processing device, when the external information processing device accesses the main function.

5. The information processing assistance device according to claim 1, wherein the vector part image is a first vector part image, the group of sub-functions is a first group of sub-functions, the raster image is a first raster image, and the cache function is a first cache function, and
   wherein, when a second group of sub-functions in the main function is changed and the first group of sub-functions is unchanged, the improved main function generation unit generates the improved main function by adding, to the main function, a second cache function for caching a second raster image drawn from a second vector part image without drawing or caching the first raster image, the second raster image being drawn from the second vector part image when the second group of sub-functions is executed.

6. The information processing assistance device according to claim 1, wherein a selected one of the group of sub-functions is a stroke function or a fill function, and
   wherein the group of sub-functions is updated when the selected sub-function is modified.

7. An information processing device displaying a vector image by executing an improved main function, and receiving the improved main function from an information processing assistance device, the improved main function including a group of sub-functions and a cache function when a vector part image of the vector image is modified, a raster image being drawn from the vector part image when the group of sub-functions is executed, the raster image being cached when the cache function is executed, the modified vector part image being stored in a memory,
   wherein the vector part image is determined to be modified without drawing the raster image when the group of sub-functions is updated,
   wherein the raster image is displayed on a user device when the improved main function is executed, and
   wherein the group of sub-functions are called in succession and in a predetermined order from a common call source when the improved main function includes the group of sub-functions and the main function is executed.

8. The information processing device of claim 7, wherein the vector part image is a first vector part image, the group of sub-functions is a first group of sub-functions, the raster image is a first raster image, and the cache function is a first cache function, and
wherein the improved main function includes, when a second group of sub-functions in the main function is changed and the first group of sub-functions is unchanged, a second cache function for caching a second raster image drawn from a second vector part image without drawing or caching the first raster image, the second raster image being drawn from the second vector part image when the second group of sub-functions is executed.

9. The information processing device according to claim 7, wherein a selected one of the group of sub-functions is a stroke function or a fill function, and
wherein the group of sub-functions is updated when the selected sub-function is modified.

10. A non-transitory computer-readable storage medium comprising computer executable instructions which, when executed by one or more processors, cause the computer to:
determine whether a vector part image of a vector image is changed by determining whether a group of sub-functions is updated without drawing a raster image from the vector part image, the raster image being drawn from the vector part image when the group of sub-functions is executed;
generate, when the vector part image of the vector image is determined to be changed, an improved main function by adding the group of sub-functions and a cache function to the main function, the raster image being drawn from the vector part image when the group of sub-functions is executed, the raster image being cached when the cache function is executed,
wherein the raster image is displayed on a user device when the main function is executed, and
wherein the group of sub-functions are called in succession and in a predetermined order from a common call source when the main function includes the group of sub-functions and the main function is executed.

11. The non-transitory computer-readable storage medium according to claim 10, wherein the computer executable instructions, when executed by the one or more processors, cause the computer to:
obtain the predetermined order of the sub-functions; and
extract the group of sub-functions having the common call source.

12. The non-transitory computer-readable storage medium according to claim 10, wherein the vector part image is a first vector part image, the group of sub-functions is a first group of sub-functions, the raster image is a first raster image, and the cache function is a first cache function, and
wherein the computer executable instructions, when executed by the one or more processors, cause the computer to generate, when a second group of sub-functions in the main function is changed and the first group of sub-functions is unchanged, the improved main function by adding, to the main function, a second cache function for caching a second raster image drawn from a second vector part image without drawing or caching the first raster image, the second raster image being drawn from the second vector part image when the second group of sub-functions is executed.

13. The non-transitory computer-readable storage medium according to claim 10, wherein the a selected one of the group of sub-functions is a stroke function or a fill function, and
wherein the group of sub-functions is updated when the selected sub-function is modified.

* * * * *